Figure 1:
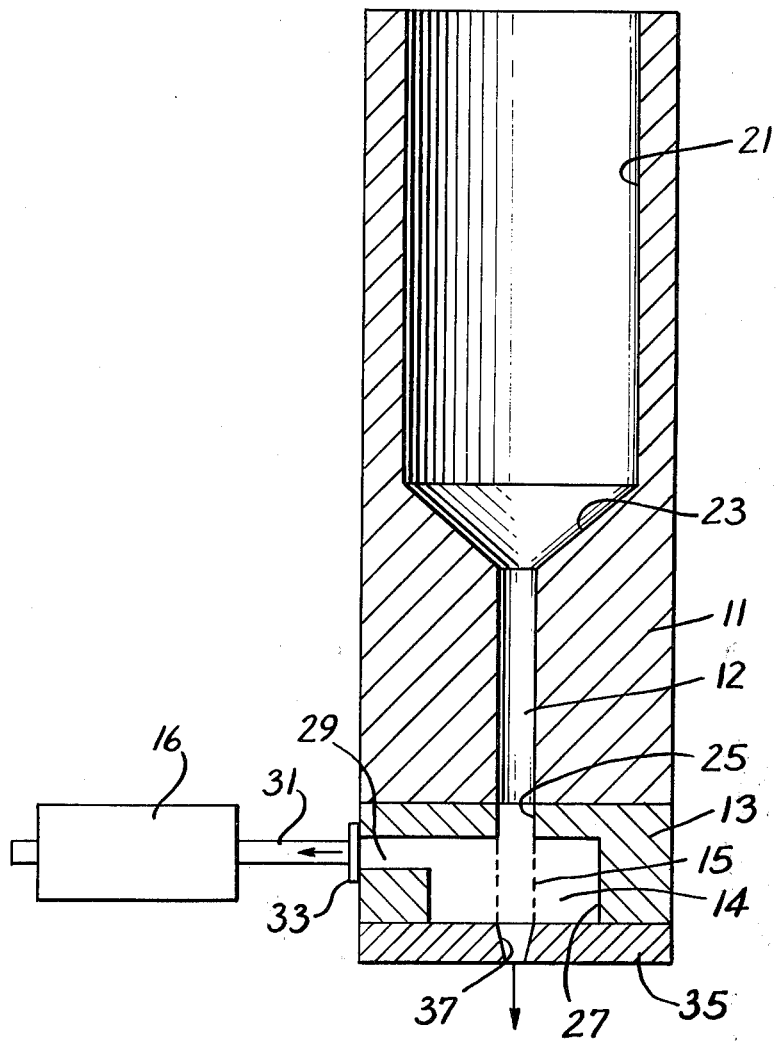

United States Patent [19]
Winkler

[11] 3,884,401
[45] May 20, 1975

[54] VALVE

[75] Inventor: Ernest Orval Winkler, San Diego, Calif.

[73] Assignee: General Atomic Company, San Diego, Calif.

[22] Filed: June 22, 1973

[21] Appl. No.: 372,675

[52] U.S. Cl. ................................. 222/544; 302/59
[51] Int. Cl. ............................................. B65g 53/40
[58] Field of Search ...... 137/13; 222/373, 544, 571; 302/23, 59

[56] References Cited
UNITED STATES PATENTS

| 808,216 | 12/1905 | Rathbone | 222/373 X |
| 1,051,905 | 2/1913 | McCord | 302/22 |
| 1,799,755 | 4/1931 | Loughridge | 222/373 X |
| 2,879,109 | 3/1959 | McInness | 302/22 |
| 3,205,016 | 9/1965 | Panning | 302/23 |

FOREIGN PATENTS OR APPLICATIONS

| 1,411,843 | 8/1964 | France | 302/2 R |
| 709,606 | 5/1954 | United Kingdom | 302/23 |
| 1,121,349 | 1/1962 | Germany | 222/544 |

Primary Examiner—Evon C. Blunk
Assistant Examiner—W. S. Carson
Attorney, Agent, or Firm—Fitch, Even Tabin & Luedeka

[57] ABSTRACT

A valve is described for controlling the flow of particulate material in a fluid medium. The particulate material flows through a passage and the passage may be selectively blocked by reducing the pressure in a plenum located along the passage such that flow of fluid through the passage is diverted into the plenum. A porous wall between the plenum and the passage causes the particulate material to build up and block the passage.

4 Claims, 2 Drawing Figures

VALVE

This invention relates to valves and, more particularly, to a valve for controlling the flow of particulate material in a fluid medium.

In the handling of particulate material, such as nuclear fuel particles, the material may flow through a passage or a network of passages in a fluid medium, such as air, inert gas, or liquid carrier. Frequently, in systems in which the flow of particulate material in a fluid medium takes place, it is desirable to provide valves for selectively halting or metering the flow of particulate material.

Prior art devices in this general area have included devices employing magnetic force to hold powdered magnetic material in a tube or pipe and thus block the flow thereof through the tube or pipe. Such devices, however, will not work for non-magnetic particles.

It is also known in the prior art to utilize various types of devices, such as blades or doors for mechanically engaging the particles and causing blockage of the pasage through which they are flowing. Under some circumstances, however, mechanical devices of this general type are undesirable, since mechanical engagement of the particles may cause damage to the particles.

It is an object of the present invention to provide an improved valve for controlling the flow of particulate material in a fluid medium.

Another object of the invention is to provide a method for controlling the flow of particulate material in a fluid medium which is capable of handling particulate material of magnetic or non-magnetic properties.

It is another object of the invention to provide an improved method for controlling the flow of particulate material in a fluid medium in which the likelihood of damage to the particulate material is minimized.

Figure 2:
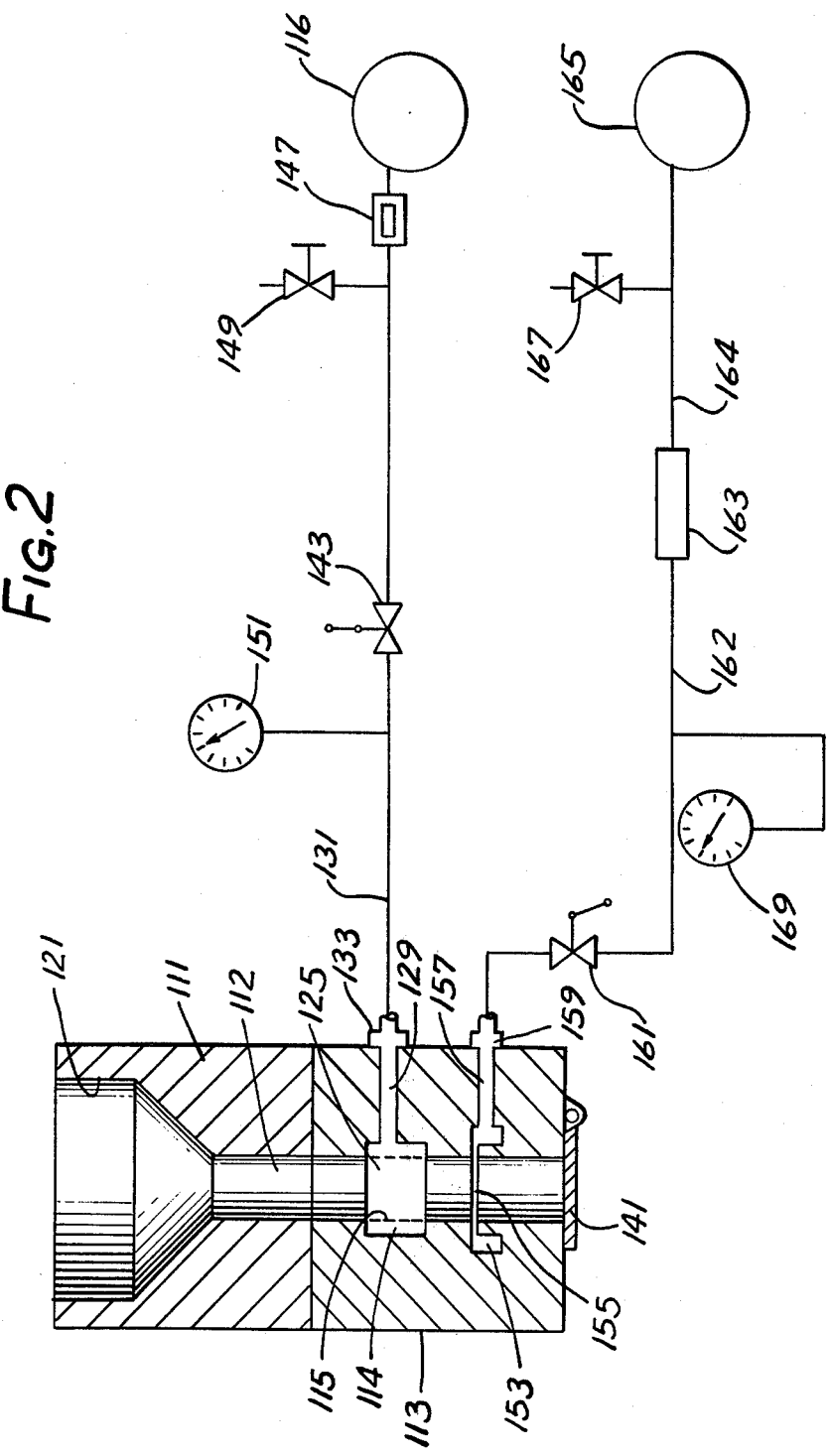

Other objects of the invention will become apparent to those skilled in the art from the following description, taken in connection with the accompanying drawings wherein:

FIG. 1 is a full section view of a valve constructed in accordance with the invention; and FIG. 2 is a schematic view of a valve constructed in accordance with the invention and which is capable of volumetric metering particulate material.

Very generally, the valve of the invention comprises means 11 defining a flow passage 12 for the particulate material and the fluid medium. Means 13 define a plenum 14 communicating with the passage 12 at a predetermined location along its length. A porous wall 15 separates the plenum from the passage. The porous wall has a porosity such that the fluid can pass therethrough but the particulate material therein can not. Means 16 are provided for selectively reducing the pressure in the plenum to divert the flow of fluid into the plenum from the passage and suspend the particulate material in the passage at the plenum. A second plenum 153 (FIG. 2) provides a pressure pulse to break up the blocked particles when the flow into the first-named plenum is terminated.

The method of the invention controls the downward flow of particulate material in a fluid medium through a generally vertical flow passage by diverting the flow of fluid through the passage at a point intermediate its ends through a porous wall having a porosity such that the fluid can pass therethrough but the particulate material therein can not. The flow diversion is of a sufficient magnitude as to suspend the particulate material in the passage at the porous wall to form a bridge across the passage thereby blocking further flow of particulate material through the passage. The size of the passage is sufficiently large that the blockked materials are subsequently released by gravitational force when the diversion of fluid flow through the porous wall is stopped.

Referring now more particularly to FIG. 1, a valve constructed in accordance with the invention is shown. The valve comprises a main housing 11 which is provided with a large diameter bore 21 at its upper end defining a hopper for particulate material. The bore 21 at the upper end is narrowed at its lower end by a frustoconical section 23 which narrows the material hopper down to communicate with the passage 12, axially aligned with the bore 21.

The lower end of the housing 11 has secured thereto a valve housing 13. The valve housing 13 is provided with a central opening 25 therein which is in alignment with the passage 12 and forms an extension thereof. An annular bore 27 is formed in the valve housing 13 from the opposite end thereof from the opening 25 and is of larger diameter and axially aligned therewith. A porous wall consisting of a wire mesh screen 15 is mounted in alignment with the passage 12 in the larger diameter bore 27, thus defining therewith the plenum 14. The plenum 14, which is generally annular, is in communication with a vacuum pump 16 which is selectively operable to reduce the pressure in the plenum 14 by evacuating same through a horizontal passage 29 formed in the valve housing 13 and through a conduit 31 coupled to the valve housing by a coupling 33.

The lower end of the plenum 14 is closed off by an orifice plate 35 which is secured to the lower surface of the valve housing 13. A frustoconical opening 37 is provided in the valve or orifice plate 35 forming a discharge orifice in alignment with the passage 12. Particulate material falling from the hopper 21 through the passage 12 empties through the orifice 37. Thus, the illustrated device may be utilized as a filling apparatus through which material from the hopper 21 may pass out of the orifice 37 and into a suitable receptacle. Alternatively, the device may be of any suitable configuration wherein a supply of material enters the passage 12 from one end and passes out of the passage 12 at the other end.

In operation of the device illustrated in FIG. 1, passage of particulate material entrained in air and passing through the passage 12 may be controlled. This is done by reducing the pressure in the plenum 14 through use of the vacuum pump 16. Reduction of pressure in the plenum 14 causes air to flow from the passage 12 into the plenum and therefore out through the passage 29, the conduit 31 and the vacuum pump 16. By reducing the pressure sufficiently, the particulate material is suspended in its fall through the passage 12 at the plenum 14, producing a block therein and effectively closing off flow of the material through the passage 12 and out of the orifice 37. Thus, when it is desired to stop the flow of particulate material through the passage 12, the vacuum pump 16 is selectively operated to produce a vacuum of the desired level in the plenum 14.

The invention will function as described over an extremely wide range of particle sizes and density values, limited only by the availability of a sufficient pressure difference between the plenum 14 and the outside ambient pressure or the pressure in the hopper 21 to create fluid dynamic or hydrodynamic forces on the individual particles great enough to suspend a locked bed within the passage 12. It is a requirement that the particles of particulate material be sufficiently rigid and of such shape that a flow of the fluid medium through the suspended or locked bed in the passage 12 at the plenum 14 may be maintained to provide the required supportive forces. For metallic particles having an average particle diameter of about 650 μm and a density of about 3.5 g. per cu. cm. successful operation of the invention may be achieved with a passage 12 of a diameter of 0.250 inch, an orifice 37 having a small diameter of 0.125 inch, and a pressure in the annular plenum 12 of minus 3 in. Hg. gage. Release may be achieved by merely restoring the plenum to its original pressure. By controlling the time of flow, the valve of FIG. 1 may be employed as a metering device.

Referring now to FIG. 2, the valve of the invention is shown employed as a volumetric metering device in a metering system. Parts having shape and function similar to that shown in the apparatus of FIG. 1, have been given identical reference numbers, preceded by a 1. Thus, material in a hopper 121 falls through a passage 112 and past a plenum 114 and porous wall 115. In the illustrated apparatus, blocking means comprising a movable bottom plate 141 is provided in order to ensure that no particles fall out of the bottom of the passage 112 when the valve of the invention is open to permit recharging of the metered volume.

A second plenum 153 is provided downstream from the plenum 114. The plenum 153 communicates with the passage 112 through an annular slit 155 positioned below the plenum 114. A passage 157 communicates through a suitable fitting 159 and a valve 161 to a pressure accumulator 163. The pressure accumulator then communicates with a pressure pump 165, and a pressure bleed valve 167 is provided for bleeding off excessive pressure in the line 164 between the pressure accumulator and the pressure pump. A pressure gauge 169 is provided connected in the line 162 between the valve 161 and the accumulator 163.

In order to provide the desired vacuum in the plenum 114, the conduit 131 is connected through a toggle valve 143 and then through a suitable filter 147 to the vacuum pump 116. A vacuum bleed valve 149 is provided in the line for bleeding air into the line as desired. A pressure gauge 151 connected to the conduit 131 enables metering of the pressure in the plenum 114.

In operating the apparatus of FIG. 2, the movable bottom plate 141 is closed and the vacuum pump 116 is operated to produce a vacuum. When it is desired to discharge the metered volume of particulate material from the passage 112, the valve 143 is opened, producing a vacuum in the plenum and preventing the flow of particulate material. Continued operation of the vacuum pump 116 maintains blockage of the passage 112. The particle stop gate 141 is then opened while the particulate material is held within the passage 112. The metered charge is then released by opening the valve 161 which releases a pressure pulse into the plenum 153 and through the slit 155. Particulate material from this elevation and downward is thereby released from the vacuum forces and falls from the passage 112 while the material above the slit 155 remains held by the vacuum flow through porous wall 115. The valve 161 is then closed and the particle stop gate 141 is closed. To refill the metered volume, valve 143 is closed allowing the pressure in plenum 114 to return to ambient and thereby releasing the particulate material. The particulate material then flows downward and refills the passage 112. The valve 143 is then again opened and the cycle repeated.

When the valve 161 is opened, the pressure accumulator 163 provides a pulse of pressure into the plenum 153 and through the slit 155 into the passage 112. This allows the particles below the porous wall 115 to flow out of the passage 112. Thus, very close metering of the particles results. As an alternative to the slit construction, the plenum 153 may communicate with the passage 112 through a porous screen similar to the screen 15 in FIG. 1.

In apparatus operated in accordance with the invention, successful metering of nuclear fuel particles has been accomplished, in charges of the order of 11 grams with a deviation therefrom of plus or minus 0.5%.

It may therefore be seen that the invention provides an improved means of controlling the flow of particulate material in a fluid medium. The invention is suitable to the metering of nuclear fuel particles, as well as other particles, and is capable of handling both magnetic and non-magnetic particles with a minimum of damage.

Various modifications of the invention in addition to those shown and described herein will become apparent to those skilled in the art from the foregoing description and accompanying drawings. Such modifications are intended to fall within the scope of the appended claims.

What is claimed is:

1. A valve for controlling and metering a flow of particulate material in a fluid medium, comprising, means defining a vertical flow passage for the particulate material and the fluid medium, means defining a first plenum communicating with said passage at a predetermined location along its length, a porous wall separating said first plenum from said passage, said porous wall having a porosity such that the fluid can pass therethrough but the particulate material therein can not, means for selectively reducing the pressure in said plenum to divert the flow of fluid into said plenum from said passage and suspend particulate material in said passage at said plenum to block flow of particulate material through said passage, means defining a second plenum communicating with said passage at a location below said first plenum, means for blocking said flow passage at a location below said second plenum, and means for producing a pressure pulse in said second plenum at a preselected time to break up the suspension of particulate material in said passage below said first plenum when said blocking means are opened, thereby releasing a metered volume of particulate material from the lower portion of said passage.

2. A valve according to claim 1 wherein said pressure pulse producing means comprise a pressure pump, a pressure accumulator coupled to said pressure pump, and a selectively operable valve coupled between said pressure accumulator and said second plenum.

3. A method for controlling the downward flow of particulate material in a fluid medium through a generally vertical flow passage, comprising, diverting the flow of fluid through said passage at a point intermediate its ends through a porous wall having a porosity such that the fluid can pass therethrough but the particulate material therein can not, said flow diversion being of sufficient magnitude as to suspend the particulate material in the passage at the porous wall to form a bridge across said passage, thereby blocking further flow of particulate material through the passage, and wherein the size of said passage is sufficiently large such that the blocked particles are subsequently released by gravitational force when the diversion of fluid flow through the porous wall is stopped.

4. A method for controlling the downward flow of particulate material in a fluid medium through a generally vertical flow passage, comprising, diverting the flow of fluid through said passage at a point intermediate its ends through a porous wall having a porosity such that the fluid can pass therethrough but the particulate material therein can not, said flow diversion being of sufficient magnitude as to suspend the particulate material in the passage at the porous wall to form a bridge across said passage, thereby blocking further flow of particulate material through the passage, the blocked particles being subsequently released when the diversion of fluid flow through the porous wall is stopped and wherein, coincident with the stopping of the diversion of fluid flow, a pressure pulse is provided to dislodge the blocked particles.

* * * * *